United States Patent
Chlus et al.

(10) Patent No.: US 10,408,066 B2
(45) Date of Patent: Sep. 10, 2019

(54) SUCTION SIDE TURBINE BLADE TIP COOLING

(75) Inventors: Wieslaw A. Chlus, Wethersfield, CT (US); Seth J. Thomen, Colchester, CT (US)

(73) Assignee: United Technologies Corporation, Farmington, CT (US)

( * ) Notice: Subject to any disclaimer, the term of this patent is extended or adjusted under 35 U.S.C. 154(b) by 1094 days.

(21) Appl. No.: 13/586,071

(22) Filed: Aug. 15, 2012

(65) Prior Publication Data

US 2014/0047842 A1 Feb. 20, 2014

(51) Int. Cl.
F01D 5/20 (2006.01)

(52) U.S. Cl.
CPC ............ *F01D 5/20* (2013.01); *F05D 2250/14* (2013.01); *F05D 2250/232* (2013.01); *F05D 2250/324* (2013.01); *F05D 2260/202* (2013.01); *Y02T 50/676* (2013.01)

(58) Field of Classification Search
CPC ..................................... F01D 5/18; F01D 5/20
See application file for complete search history.

(56) References Cited

U.S. PATENT DOCUMENTS

| | | | |
|---|---|---|---|
| 4,390,320 A | 6/1983 | Eiswerth | |
| 4,743,462 A | 5/1988 | Radzavich et al. | |
| 6,494,678 B1 | 12/2002 | Bunker | |
| 6,824,359 B2 * | 11/2004 | Chlus et al. | 416/92 |
| 6,951,447 B2 | 10/2005 | Cherolis et al. | |
| 7,195,456 B2 | 3/2007 | Aggarwala et al. | |
| 7,413,403 B2 | 8/2008 | Cunha et al. | |
| 7,591,070 B2 | 9/2009 | Lee | |
| 7,980,820 B2 | 7/2011 | Gayman et al. | |
| 8,061,987 B1 | 11/2011 | Liang | |
| 8,172,507 B2 | 5/2012 | Liang | |
| 8,186,965 B2 | 5/2012 | Kuhne et al. | |
| 2003/0021684 A1 * | 1/2003 | Downs et al. | 416/92 |
| 2004/0096328 A1 * | 5/2004 | Soechting et al. | 416/92 |
| 2008/0118367 A1 * | 5/2008 | Liang et al. | 416/97 R |

(Continued)

FOREIGN PATENT DOCUMENTS

| EP | 1 529 153 B1 | 6/2008 |
|---|---|---|
| EP | 2434097 | 9/2012 |

OTHER PUBLICATIONS

International Preliminary Report on Patentability for International Application No. PCT/US2013/050429 dated Feb. 26, 2015.

(Continued)

*Primary Examiner* — Carlos A Rivera
*Assistant Examiner* — Cameron A Corday
(74) *Attorney, Agent, or Firm* — Carlson, Gaskey & Olds, P.C.

(57) ABSTRACT

An airfoil for a gas turbine engine includes pressure and suction walls spaced apart from one another and joined at leading and trailing edges to provide an airfoil that extends in a radial direction. The airfoil has a cooling passage arranged between the pressure and suction walls that extend toward a tip of the airfoil. The tip includes a pocket that separates the pressure and suction walls. Scarfed cooling holes fluidly connect the cooling passage to the pocket. The scarfed cooling holes include a portion that is recessed into a face of the suction wall and exposed to the pocket.

16 Claims, 4 Drawing Sheets

(56) References Cited

U.S. PATENT DOCUMENTS

| | | |
|---|---|---|
| 2009/0092500 A1 | 5/2009 | Boury et al. |
| 2009/0324422 A1 | 12/2009 | Klasing et al. |
| 2010/0135813 A1* | 6/2010 | Marini .................. F01D 5/20 416/223 R |
| 2011/0227344 A1* | 9/2011 | Hatton et al. .................. 290/52 |
| 2012/0070308 A1 | 3/2012 | Naik et al. |

OTHER PUBLICATIONS

International Search Report & Written Opinion for PCT/US2013/050429 . Completion of search Apr. 28, 2014.
Extended European Search Report for European Patent Application No. 13846039.9, dated Jul. 27, 2015.

\* cited by examiner

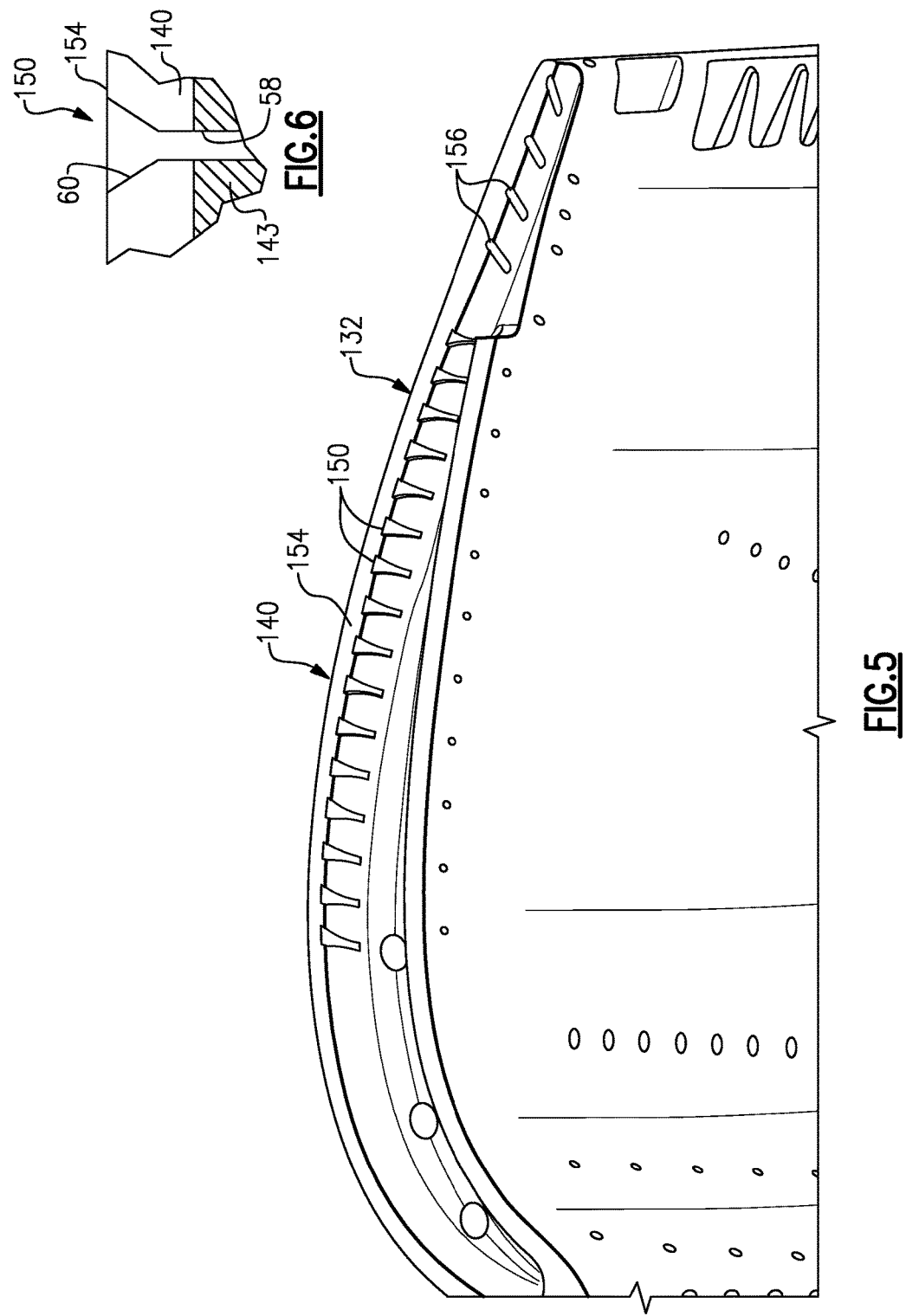

US 10,408,066 B2

SUCTION SIDE TURBINE BLADE TIP COOLING

BACKGROUND

This disclosure relates to an airfoil having a-tip cooling features for use in, for example, an industrial gas turbine engine.

Industrial gas turbine blades may experience tip burning due to the increased temperatures at the airfoil tip, especially on first stage turbine blades. Tips are often cooled with internal core cooling air that is released through radial holes on the surface of a tip pocket, which is provided between pressure and suction walls. These cooling holes are provided in an end wall that joins the pressure and suction walls and are spaced inwardly from the pressure and suction walls at the interior of the pocket. The cooling holes pressurize the pocket to resist hot gas path air from flowing into the pocket and oxidizing the tip material. Much of the cooling air is mixed with hot gas path air and lost in the flow of the gas path.

SUMMARY

In one exemplary embodiment, an airfoil for a gas turbine engine includes pressure and suction walls spaced apart from one another and joined at leading and trailing edges to provide an airfoil that extends in a radial direction. The airfoil has a cooling passage arranged between the pressure and suction walls that extend toward a tip of the airfoil. The tip includes a pocket that separates the pressure and suction walls. Scarfed cooling holes fluidly connect the cooling passage to the pocket. The scarfed cooling holes include a portion that is recessed into a face of the suction wall and exposed to the pocket.

In a further embodiment of any of the above, the suction wall terminates in a suction side edge at the tip. The scarfed cooling holes extend to the suction side edge.

In a further embodiment of any of the above, the scarfed cooling holes include a semi-circular cross-section.

In a further embodiment of any of the above, the scarfed cooling holes are at an angle relative to the radial direction.

In a further embodiment of any of the above, the pressure side wall has a notch at the trailing edge.

In a further embodiment of any of the above, the airfoil includes an end wall joining the pressure and suction walls at the pocket. The scarfed cooling holes extend through the end wall.

In a further embodiment of any of the above, the airfoil includes other cooling holes that extend through the end wall and are spaced from the pressure and suction walls.

In a further embodiment of any of the above, the scarfed cooling holes include a non-semi-circular cross-section.

In a further embodiment of any of the above, the suction wall terminates in a suction side edge at the tip. The scarfed cooling holes include a neck portion adjoining a diffuser portion. The diffuser portion terminates at the suction side edge.

In a further embodiment of any of the above, the airfoil is a turbine blade.

In another exemplary embodiment, a gas turbine engine includes a compressor and turbine section mounted to a shaft, and a combustor arranged between the compressor and turbine section. The gas turbine engine includes an airfoil in one of the compressor and turbine sections. The airfoil includes pressure and suction walls spaced apart from one another and joined at leading and trailing edges to provide an airfoil that extends in a radial direction. The airfoil has a cooling passage arranged between the pressure and suction walls that extend toward a tip of the airfoil. The tip includes a pocket separating the pressure and suction walls, and scarfed cooling holes fluidly connect the cooling passage to the pocket. The scarfed cooling holes include a portion that is recessed into a face of the suction wall and exposed to the pocket.

In a further embodiment of any of the above, the airfoil is a blade in the turbine section.

In a further embodiment of any of the above, the gas turbine engine includes a power turbine that is downstream from the turbine section. The power turbine is coupled to a generator configured to supply power to a power grid.

In a further embodiment of any of the above, the suction wall terminates in a suction side edge at the tip. The scarfed cooling holes extend to the suction side edge. The pressure side wall has a notch at the trailing edge.

In a further embodiment of any of the above, the scarfed cooling holes are at an angle relative to the radial direction and near the notch.

In a further embodiment of any of the above, the gas turbine engine includes an end wall joining the pressure and suction walls at the pocket. The scarfed cooling holes extending through the end wall.

In a further embodiment of any of the above, the gas turbine engine includes other cooling holes extending through the end wall and spaced from the pressure and suction walls.

In a further embodiment of any of the above, the scarfed cooling holes include a semi-circular cross-section.

In a further embodiment of any of the above, suction wall terminates in a suction side edge at the tip. The scarfed cooling holes include a neck portion adjoining a diffuser portion. The diffuser portion terminates at the suction side edge.

In another exemplary embodiment, an airfoil for a gas turbine engine includes pressure and suction walls spaced apart from one another and joined at leading and trailing edges to provide an airfoil that extends in a radial direction. The airfoil has a cooling passage arranged between the pressure and suction walls that extend toward a tip of the airfoil. The tip includes a pocket separating the pressure and suction walls. Scarfed cooling holes fluidly connect the cooling passage to the pocket. The scarfed cooling holes include a portion recessed into a face of one of the pressure and suction walls and exposed to the pocket.

BRIEF DESCRIPTION OF THE DRAWINGS

The disclosure can be further understood by reference to the following detailed description when considered in connection with the accompanying drawings wherein:

FIG. 5 is another perspective view of a scarfed cooling hole arrangement in the airfoil tip.

FIG. 6 is an enlarged cross-sectional view of a scarfed cooling hole shown in FIG. 5.

DETAILED DESCRIPTION

Figure 1:
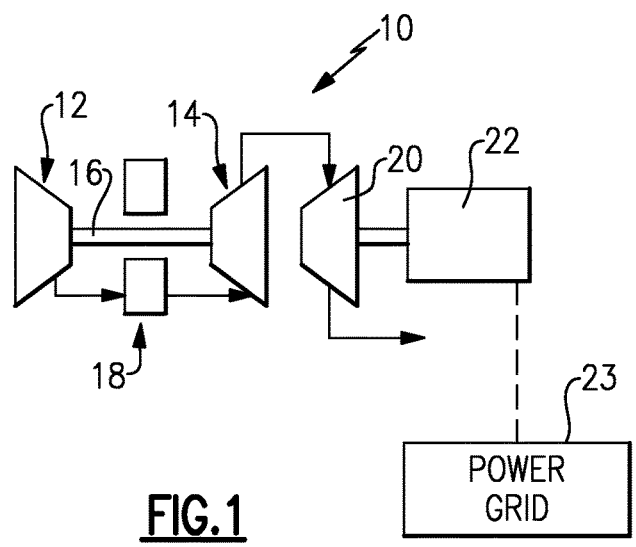
FIG. 1 is a schematic cross-sectional view of an example industrial gas turbine engine.

A schematic view of an industrial gas turbine engine 10 is illustrated in FIG. 1. The engine 10 includes a compressor section 12 and a turbine section 14 interconnected to one another by a shaft 16. A combustor 18 is arranged between the compressor and turbine sections 12, 14. A power turbine 20 is arranged downstream from the turbine section 14. The power turbine 20 rotationally drives a generator 22, which is connected to a power grid 23. It should be understood that the illustrated engine 10 is highly schematic, and may vary from the configuration illustrated. Moreover, the disclosed airfoil may be used in commercial and military aircraft engines as well as industrial gas turbine engines.

Figure 2:
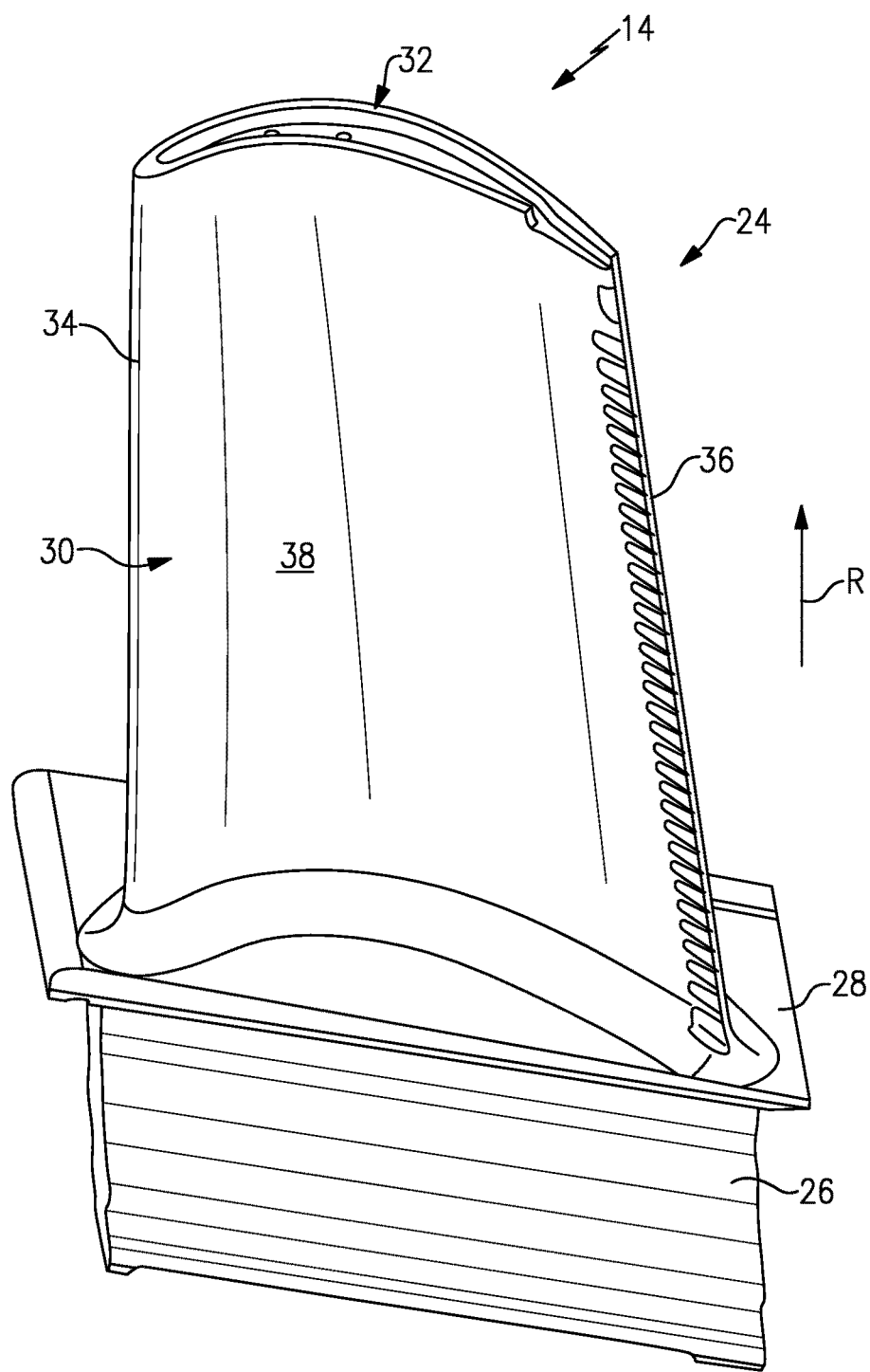
FIG. 2 is a perspective view of an example airfoil including one example disclosed tip cooling configuration.

The turbine section 14 includes multiple turbine blades, one of which is illustrated at 24 in FIG. 2. The turbine blade 24 includes a root 26 configured to be supported by a rotor mounted to the shaft 16. A platform 28 is mounted on the root 26, and an airfoil 30 extends in a radial direction R from the platform 28 to a tip 32.

Figure 4:
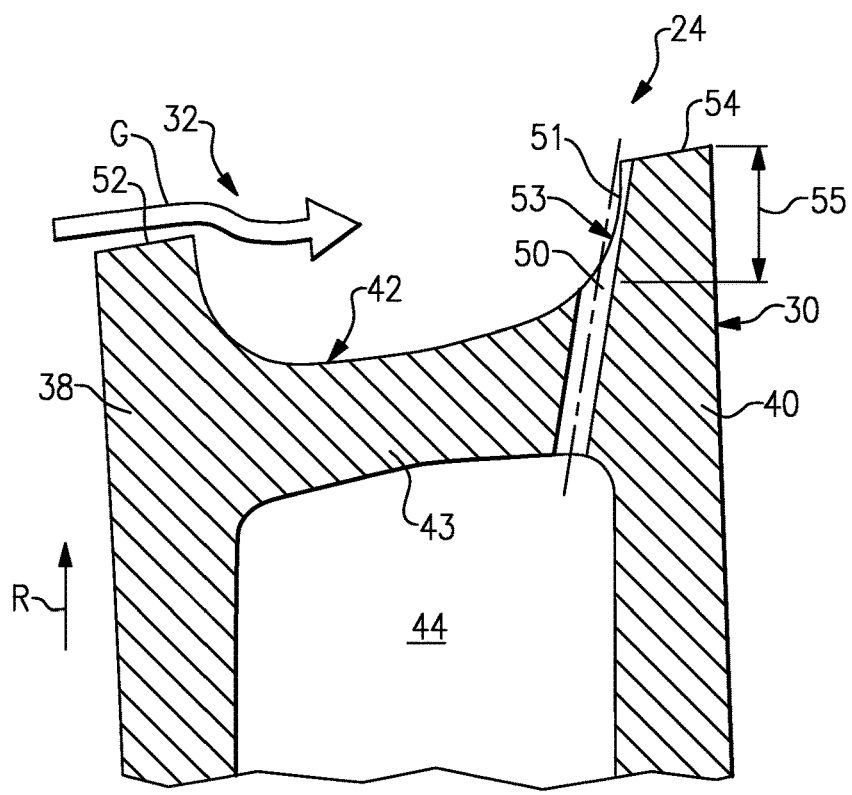
FIG. 4 is a cross-sectional view of the airfoil shown in FIG. 3 taken along line 4-4.
Figure 3:
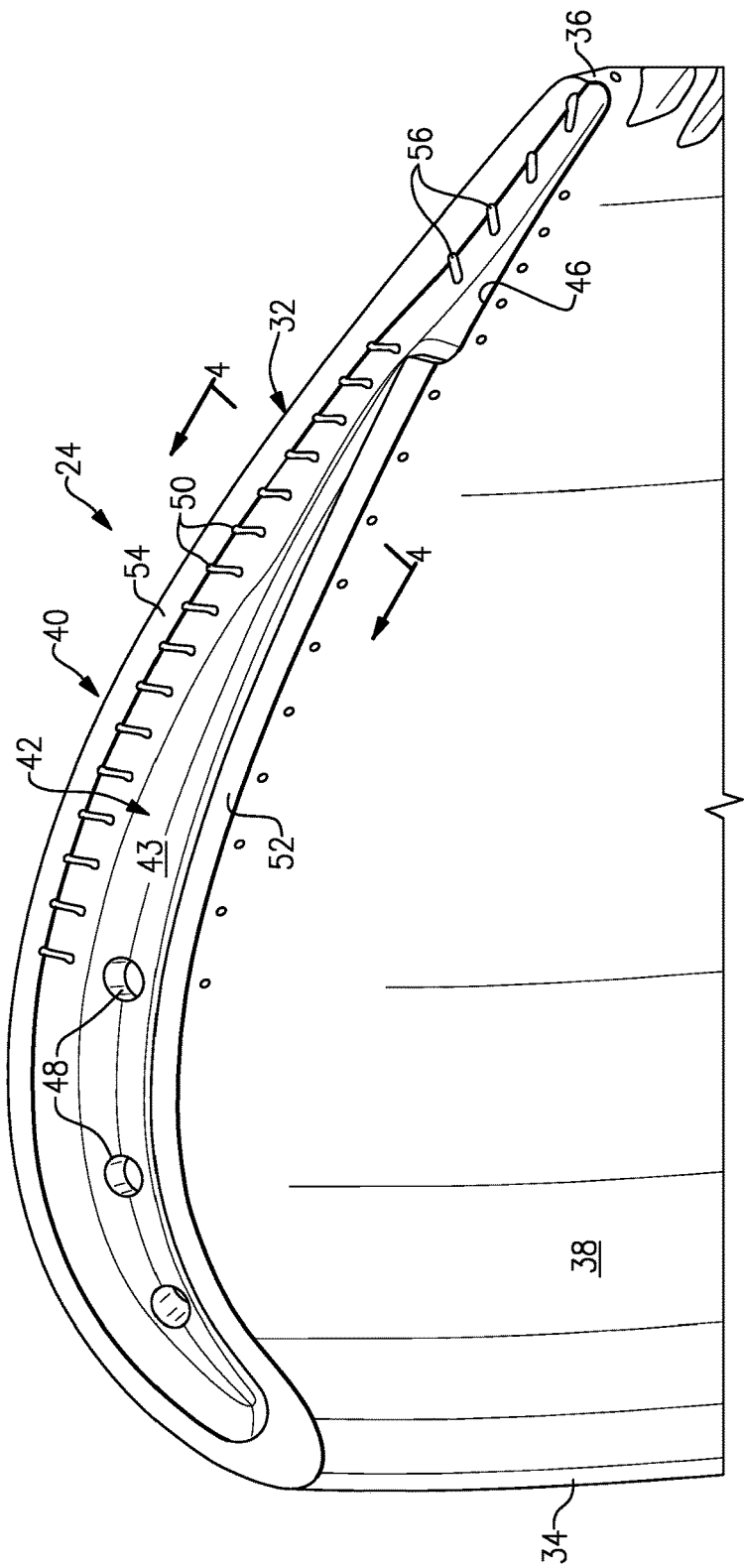
FIG. 3 is a perspective view of a scarfed cooling hole arrangement in the airfoil tip.

Referring to FIGS. 2 and 3, the airfoil 30 is provided by spaced apart pressure and suction walls 38, 40 that are joined to one another at leading and trailing edges 34, 36. The tip 32 includes a pocket 42 that receives cooling fluid from a cooling passage 44 (shown in FIG. 4) arranged within the airfoil 30 between the pressure and suction walls 38, 40, as best shown in FIG. 4. A notch 46 arranged near the trailing edge 36 permits the cooling fluid to flow from the pocket 42 near the trailing edge 36, as best illustrated in FIG. 3.

An end wall 43 joins the pressure and suction walls 38, 40 beneath the pocket 42. Cooling holes 48 may extend through the end wall 43 to fluidly connect the pocket 42 to the cooling passage 44. A first set of scarfed cooling holes 50 fluidly interconnect the cooling passage 44 to the pocket 42. A portion 53 of the scarfed cooling holes 50 are recessed into a face 51 of the suction wall 40 within the pocket 42, best shown in FIG. 4. The recessed portion 53 provides a channel extending a radial length 55 in the radial direction R. The scarfed cooling holes 50 extend to the suction side edge 54. The suction side edge 54 and a pressure side edge 52 are adjacent to a blade outer air seal (not shown).

In the examples illustrated in FIGS. 3 and 4, the scarfed cooling holes 50, in particular, the recessed portion 53, provide a semi-circular cross-section. A second set of scarfed cooling holes 56 are arranged in the pocket 42 adjacent to the notch 46. In this region, the second set of scarfed cooling holes 56 is oriented differently than the first scarfed holes 50 and at an angle relative to the radial direction R.

The scarfed cooling holes 50, 56 may be drilled or otherwise provided. The scarfed configuration enables cooling air to be entrained within the channels, which improves heat transfer and cooling of the suction wall 40. Entraining the cooling air helps resist the cooling air from being washed out of the tip pocket by gases G from the gas flow path flowing past the pressure side edge 52 into the pocket 42. As a result, the potential for tip burning is reduced.

The scarfed cooling holes/channels could be round or shaped, perpendicular or angled to the face of the pocket 42. Scarfed cooling holes 150, 156 may be provided having a different shape, as best illustrated in FIGS. 5 and 6. The scarfed holes 150 in the suction wall 140 include a neck portion 58 and a diffuser portion 60, which extends to the suction side edge 154 of the tip 132. The neck portion 60 extends through the end wall 143.

Although an example embodiment has been disclosed, a worker of ordinary skill in this art would recognize that certain modifications would come within the scope of the claims. For that reason, the following claims should be studied to determine their true scope and content.

What is claimed is:

1. An airfoil for a gas turbine engine comprising:
pressure and suction walls spaced apart from one another and joined at leading and trailing edges to provide an airfoil that extends in a radial direction, the airfoil has a cooling passage arranged between the pressure and suction walls that extends toward a tip of the airfoil, the tip includes a pocket separating the pressure and suction walls, wherein the pressure wall has a notch at the trailing edge that is in fluid communication with and adjoining the pocket; and
scarfed cooling holes fluidly connect the cooling passage to the pocket, the scarfed cooling holes including a portion recessed into a face of the suction wall and exposed to the pocket, the scarfed cooling holes include first and second sets of scarfed holes, the second set of scarfed holes oriented differently than the first set of scarfed holes, wherein the second set of scarfed holes are at an angle relative to the radial direction and near the notch.

2. The airfoil according to claim 1, wherein the suction wall terminates in a suction side edge at the tip, the scarfed cooling holes extend to the suction side edge.

3. The airfoil according to claim 1, wherein the scarfed cooling holes include a semi-circular cross-section.

4. The airfoil according to claim 1, comprising an end wall joining the pressure and suction walls at the pocket, the scarfed cooling holes extending through the end wall.

5. The airfoil according to claim 4, comprising other cooling holes extending through the end wall and spaced from the pressure and suction walls.

6. The airfoil according to claim 1, wherein the scarfed cooling holes include a non-semi-circular cross-section.

7. The airfoil according to claim 6, wherein the suction wall terminates in a suction side edge at the tip, the scarfed cooling holes include a neck portion adjoining a diffuser portion, the diffuser portion terminating at the suction side edge.

8. The airfoil according to claim 1, wherein the airfoil is a turbine blade.

9. A gas turbine engine comprising:
a compressor and turbine section mounted to a shaft, and a combustor arranged between the compressor and turbine section; and
an airfoil in one of the compressor and turbine sections, the airfoil including pressure and suction walls spaced apart from one another and joined at leading and trailing edges to provide an airfoil that extends in a radial direction, the airfoil has a cooling passage arranged between the pressure and suction walls that extends toward a tip of the airfoil, the tip includes a pocket separating the pressure and suction walls, an end wall joining the pressure and suction walls at the pocket, the pressure and suction walls respectively provides pressure and suction side edges extending radially beyond the end wall and together substantially circumscribing the pocket around a pressure side and a suction side of the airfoil, and the pressure wall has a notch at the trailing edge and adjoining the pocket, and scarfed cooling holes fluidly connect the cooling passage to the pocket, the scarfed cooling holes including a portion recessed into a face of the suction wall and exposed to the pocket, the scarfed cooling holes include first and second sets of scarfed holes, the second set of scarfed holes oriented differently than the first set of scarfed holes, wherein the second set of scarfed holes are at an angle relative to the radial direction and near the notch.

10. The gas turbine engine according to claim 9, wherein the airfoil is a blade in the turbine section.

11. The gas turbine engine according to claim 9, comprising a power turbine downstream from the turbine section, the power turbine coupled to a generator configured to supply power to a power grid.

12. The gas turbine engine according to claim 9, wherein the suction wall terminates in the suction side edge at the tip, the scarfed cooling holes extend to the suction side edge.

13. The gas turbine engine according to claim 9, wherein the scarfed cooling holes extend through the end wall.

14. The gas turbine engine according to claim 13, comprising other cooling holes extending through the end wall and spaced from the pressure and suction walls.

15. The gas turbine engine according to claim 9, wherein the scarfed cooling holes include a semi-circular cross-section.

16. The gas turbine engine according to claim 9, wherein suction wall terminates in the suction side edge at the tip, the scarfed cooling holes include a neck portion adjoining a diffuser portion, the diffuser portion terminating at the suction side edge.

\* \* \* \* \*